United States Patent
Gross et al.

(10) Patent No.: US 7,561,578 B2
(45) Date of Patent: Jul. 14, 2009

(54) SYSTEM AND METHOD FOR TRAVERSING METADATA ACROSS MULTIPLE NETWORK DOMAINS AT VARIOUS LAYERS OF THE PROTOCOL STACK

(75) Inventors: David Gross, Saddle River, NJ (US); Timothy C. Williams, Sterling, VA (US); Robert Babiskin, Rockville, MD (US); Randall E. Breeden, Shantilly, VA (US)

(73) Assignee: Cryptek, Inc., Sterling, VA (US)

( * ) Notice: Subject to any disclaimer, the term of this patent is extended or adjusted under 35 U.S.C. 154(b) by 565 days.

(21) Appl. No.: 10/987,303

(22) Filed: Nov. 15, 2004

(65) Prior Publication Data

US 2005/0122979 A1 Jun. 9, 2005

Related U.S. Application Data

(60) Provisional application No. 60/519,252, filed on Nov. 13, 2003.

(51) Int. Cl.
*H04L 12/28* (2006.01)
(52) U.S. Cl. .............. 370/395.2; 370/395.3; 370/395.7; 707/1; 707/3; 709/223; 709/229
(58) Field of Classification Search .................. 709/223; 370/469
See application file for complete search history.

(56) References Cited

U.S. PATENT DOCUMENTS

| | | | | |
|---|---|---|---|---|
| 5,835,904 | A * | 11/1998 | Vicik et al. | 707/1 |
| 6,832,249 | B2 * | 12/2004 | Ciscon et al. | 709/223 |
| 7,239,634 | B1 * | 7/2007 | Chakravorty | 370/392 |
| 2004/0057418 | A1 * | 3/2004 | Poon et al. | 370/352 |
| 2004/0122967 | A1 * | 6/2004 | Bressler et al. | 709/232 |
| 2005/0033808 | A1 * | 2/2005 | Cheng et al. | 709/205 |
| 2005/0169309 | A1 * | 8/2005 | Tripathi et al. | 370/469 |

FOREIGN PATENT DOCUMENTS

| | | |
|---|---|---|
| EP | 1 191 438 A2 | 3/2002 |
| WO | WO 02/48899 A1 | 6/2002 |

* cited by examiner

*Primary Examiner*—Gregory B Sefcheck
*Assistant Examiner*—Salvador E Rivas
(74) *Attorney, Agent, or Firm*—Jacobson Holman PLLC (57) ABSTRACT

An inter-networking system and method that provides for access control identifier (ACI) metadata utilization for the life of a session even on unknown networks being traversed, allowing for ACI metadata utilization, reutilization, and modification in both the send and receive paths (bi-directional), and allowing for metadata transport over network segments requiring that ACIs be embedded at different layers of the communications stack.

14 Claims, 7 Drawing Sheets

SYSTEM AND METHOD FOR TRAVERSING METADATA ACROSS MULTIPLE NETWORK DOMAINS AT VARIOUS LAYERS OF THE PROTOCOL STACK

This application is entitled to and hereby claims the priority of co-pending U.S. Provisional application, Ser. No. 60/519,252 filed Nov. 13, 2003.

BACKGROUND OF THE INVENTION

1. Field of the Invention

The present invention is related to the field of inter-computer networking and more particularly to a methodology and/or protocol that requires network header metadata, such as access control identifiers (ACIs), to be transitioned and operated upon among a plurality of separately defined computer network domains. The present invention is also related to the field of encrypted computer network communication and, more particularly, to a methodology for implementing functions that require unencrypted data in a secure computer network.

2. Description of the Related Art

A network typically requires the transmission of access control identifiers (ACIs) at various layers of a communication stack to enable successful completion of an end-to-end (E2E) transmission. Across that E2E path, however, are various service facilities that utilize the ACIs, whether in the header or embedded in the payload, for functions such as routing, inspection, user or location identification, forwarding, etc. When such a service facility, e.g., a proxy server, post office or other application-based traversal mechanism, is utilized, the ACIs are lost and are no longer available to a session protocol. This loss of ACIs, for example in IP identifiers, occurs due to the layer mechanisms inherent in the protocol stack. Specifically, the processing elements operating at a particular layer can operate only on ACIs available to that particular layer and not at layers above or below. As a result, the intervening service facility causes services such as access control capability to be lost and/or terminated, leaving only routing data available for reuse.

Various prior art methods have been proposed which teach that a singular self-contained service can be used to inspect the payload and compare it against a store of known rules prior to forwarding. Service facilities disclosed for such methods can operate on predefined network topologies and are used within these topologies to provide some service, e.g. forwarding or inspection. These prior art approaches provide no inheritance of the ACIs across services within the communications path and are limited to cascading services performed within a single network domain.

In sum, existing service facilities within networks are unidirectional, self-contained and/or require known network-specific topologies. Services based on the existing art have limited session facilities on the network, requiring service functions to be embedded within the application itself or within a series of applications as part of the application codes/functions. Session persistence is only maintained by the application and is otherwise terminated when the session-layer ACIs are lost between applications or service facilities. The existing art does not provide service mechanisms that allow bi-directional movement of the ACIs as is required in a session-based service.

Additionally, a secure computer network requires the transmission of encrypted data with associated ACIs from a data source to a specified data destination. However, many computer network functions such as intrusion detection, load balancing, TCP/IP acceleration, etc. need to operate on cleartext or unencrypted data and will not perform properly when processing encrypted data. Thus, functions requiring cleartext, when embedded within a conventional secure network, do not perform properly.

A mechanism for providing access control on network communications used by the Department of Defense is to place identifiers on Internet Protocol (IP) data streams. These identifiers can be checked at the source and destination host machines to determine if the sender can send that type of information and whether the receiver can receive that type of information. In a standard client server environment, where all systems between the two host systems operate only on the IP layer, this access control mechanism has been shown to work well and has many government approvals for its operation.

However, when a proxy, service facility or other application-based traversal mechanism is utilized, IP identifiers that are placed on the individual packets are lost and thus network-level access control mechanisms cannot be utilized. This loss is consistent with the operation of the standard TCP/IP and IPsec protocol stacks which operate in a layered fashion where processing elements operating at a particular layer can see all data at that level and above, but none below. Since the proxy/application is at the application layer, it cannot generally see information at the IP layer.

Therefore, a need exists for a system and method by which header data at different layers of the communications protocol stack is maintained throughout a network session that traverses multiple networks and domains.

SUMMARY OF THE INVENTION

In view of the foregoing, one object of the present invention is to provide a session-level bridging mechanism to retain, operate on and forward ACIs across a plurality of functionalities.

Another object of the present invention is to provide an inter-networking method that provides for metadata utilization for the life of a session even on unknown networks being traversed, allowing for metadata utilization, reutilization, and modification in both the send and receive paths (bi-directional), and allowing for transport over segments requiring that ACIs be embedded at different layers of the communications stack.

A further object of the present invention is to provide a session-level service-to-service mechanism that traverses from within one network domain to other known or unknown network domain, enforcing and utilizing header metadata across the combined inter-network.

A still further object of the present invention is to provide an inter-networking service-to-service mechanism that allows ACIs to be transmitted and utilized among networks where the method of transfer of the ACIs may be at different layers of the network stack.

Yet another object of the present invention is to provide a mechanism to retain ACIs across a functionality that requires cleartext within an encrypted communication.

A still further object of the present invention is to provide a function embedding unit including an ACI virtual private network (VPN) that performs decryption and retains the ACIs, and an ACI VPN that performs encryption and reinserts the ACIs which were traversed across an embedded function requiring non-encrypted data.

In accordance with these and other objects, the present invention is directed to a session-level bridging mechanism to retain, operate on and forward ACIs across a plurality of functionalities. This plurality of functionalities defines a session as utilized on multi-tier applications that operate across multiple E2E network services. In this manner, a service-to-service protocol invention, with an accompanying retention store that allows ACIs to transition from one peer-to-peer connection to another peer-to-peer connection, is defined. As a session protocol, the present invention is utilized bi-directionally, both on the forward communication path as well as on the return path, without requiring any application awareness or internal mechanisms to transition between network connections. As used herein, this service-to-service mechanism is referred to as the F-Function.

The F-Function according to the present invention is a session protocol, and becomes a network service for application developers who can thread and bind multiple existing applications (processes) and directories, or any other network service, into a cohesive transaction without application awareness or modification.

The present invention may be used advantageously in multi-tier applications that are prevalent in service-oriented architectures or web-service architectures. For example, a content-based access control may be enforced across a multi-tier structure. In the first connection of the session, the client connects to the application tier with network or data ACIs transported in the IP option field. The ACIs are then re-utilized by the application server to connect to a database server. The service facility, having maintained the session data including the ACIs, utilizes an F-Function that applies rules based on the received ACIs so that the proper data at the database server, i.e., data having content which the client is authorized to receive in accordance with the established content-based access control, is accessed and returned to the application server for forwarding to the client.

The present invention may also be used advantageously to allow an encrypted network that requires an intermediate node to utilize cleartext functions, such as inspection, by maintaining the ACIs through the application of the F-Function. The F-Function is able to first read the ACIs from the inbound IP stream, retain the ACIs during the inspection processing, and then to place the ACIs on each outbound IP stream such that there is no loss of the ACIs originally placed on the data packets due to the decryption mechanism.

Thus, the present invention also provides a mechanism to terminate IP/IPsec data streams that contain ACIs at the device, read and store the ACIs from the inbound IP packets, provide these identifiers on the outbound IP packets and utilize the identifiers to instantiate a secure channel with the destination system.

The F-Function protocol and mechanism according to the present invention provides a new network mechanism for creating session controls across an inter-network of networks rather than requiring application-aware internal controls to accomplish session connectivity.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The specific configurations described in the proceeding discussion of the present invention are illustrative of the invention's methods and in fact these methods can be used to construct many complex structures and topologies and are building blocks for a network.

Figure 1:
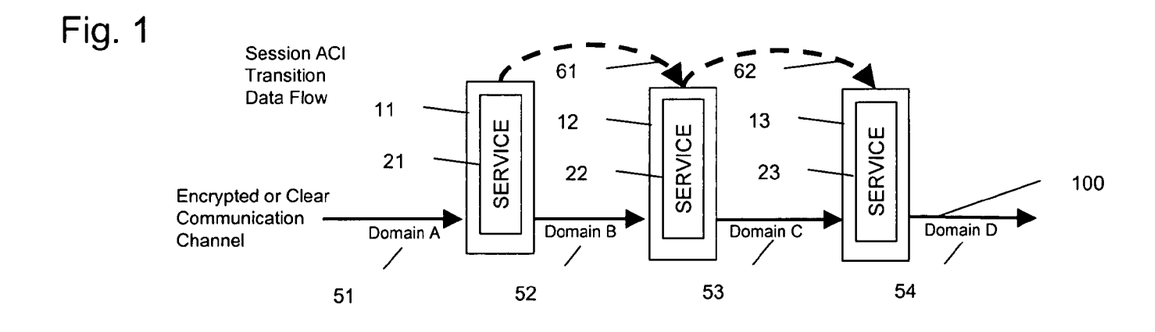
FIG. 1 is a block diagram of a multi-domain network connection system that provides multiple service facilities across an E2E session where an F-Function embeds, stores, forwards and processes ACIs between service facilities on both forward and return paths, according to a first embodiment of the present invention.

As shown in FIG. 1, the present invention is directed to a system and a methodology/protocol for enabling interconnected networks, each defined as a separate domain 51, 52, 53, 54, to carry, replicate and reutilize ACIs within the packet headers across the multiple domains 51-54 along communications path 100. Service facilities 11, 12, 13 within these networks provide various services, such as inspection, and also provide for the forwarding of ACIs.

FIG. 1 illustrates specific network service applications 21, 22, 23 that are incorporated into self-contained network service facilities 11, 12, 13 and which provide one or more inter-service mechanisms referred to as F-Functions 61, 62. These specific service applications 21, 22, 23 in conjunction with the F-Functions 61, 62 provide the bridging transport mechanism and retention capabilities for ACI utilization and re-utilization across a plurality of networks and computer applications (nodes) typically utilized in a session. The service facilities also provide the capability to transfer the ACIs at different layers of the communications stack 99 of communications path 100 (see FIGS. 6-8).

Figure 2:
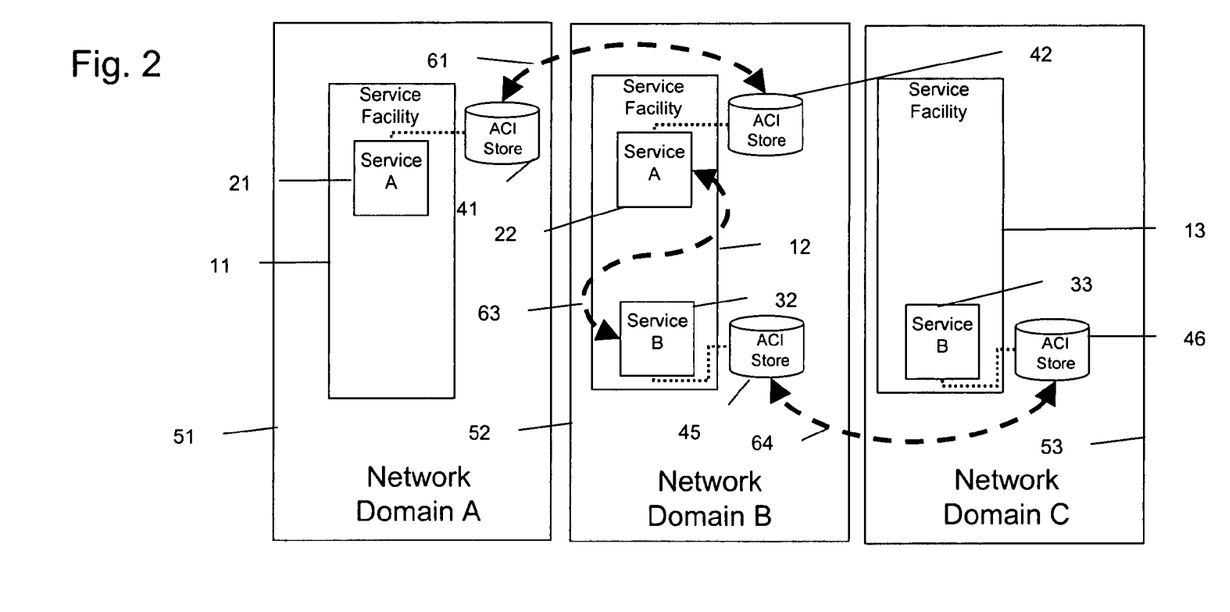
FIG. 2 is a block diagram of the architecture of the F-Function services within the service facilities, according to the present invention.
Figure 3:
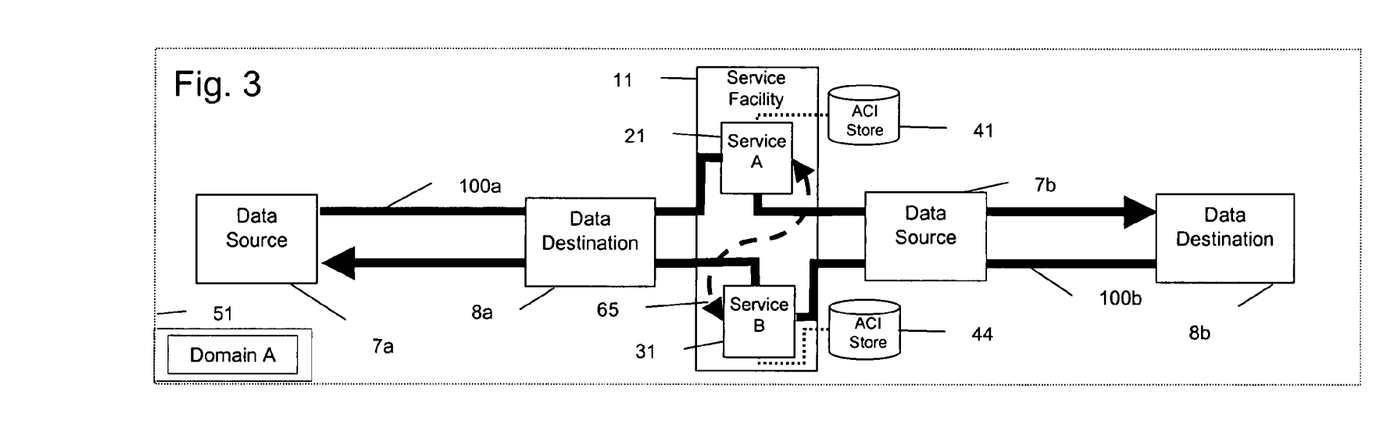
FIG. 3 is a block diagram of the process flow through multiple F-Function services operating within a single service facility and includes multiple E2E connections within the session, according to the present invention.
Figure 4:
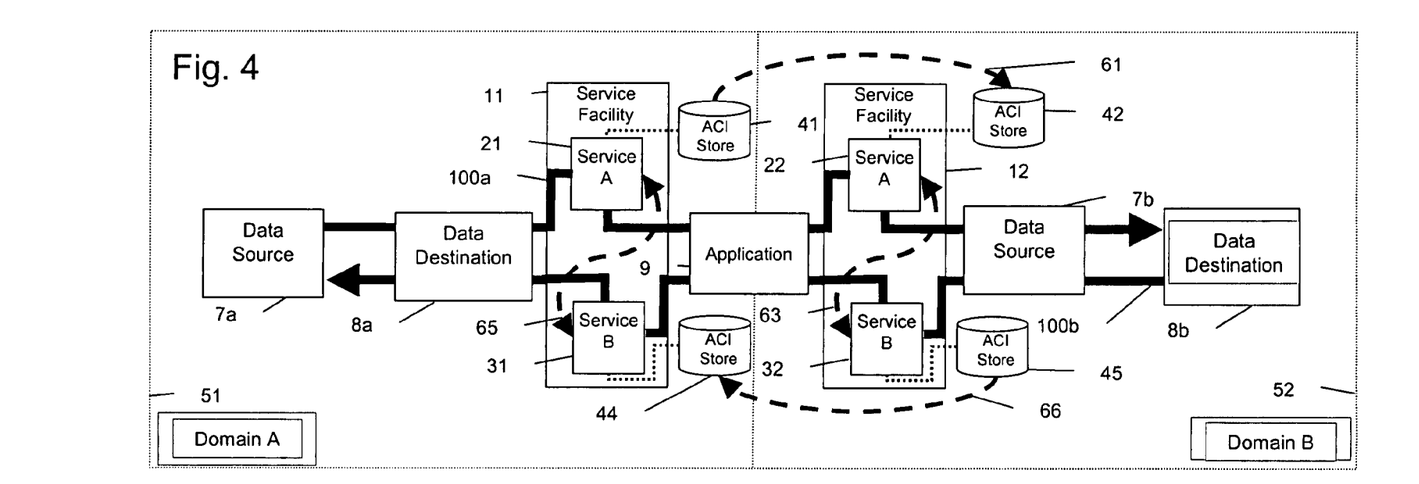
FIG. 4 is a block diagram of the process flow through multiple F-Function services operating among multiple service facilities and includes multiple E2E connections within the session, according to a further embodiment of the present invention.
Figure 5:
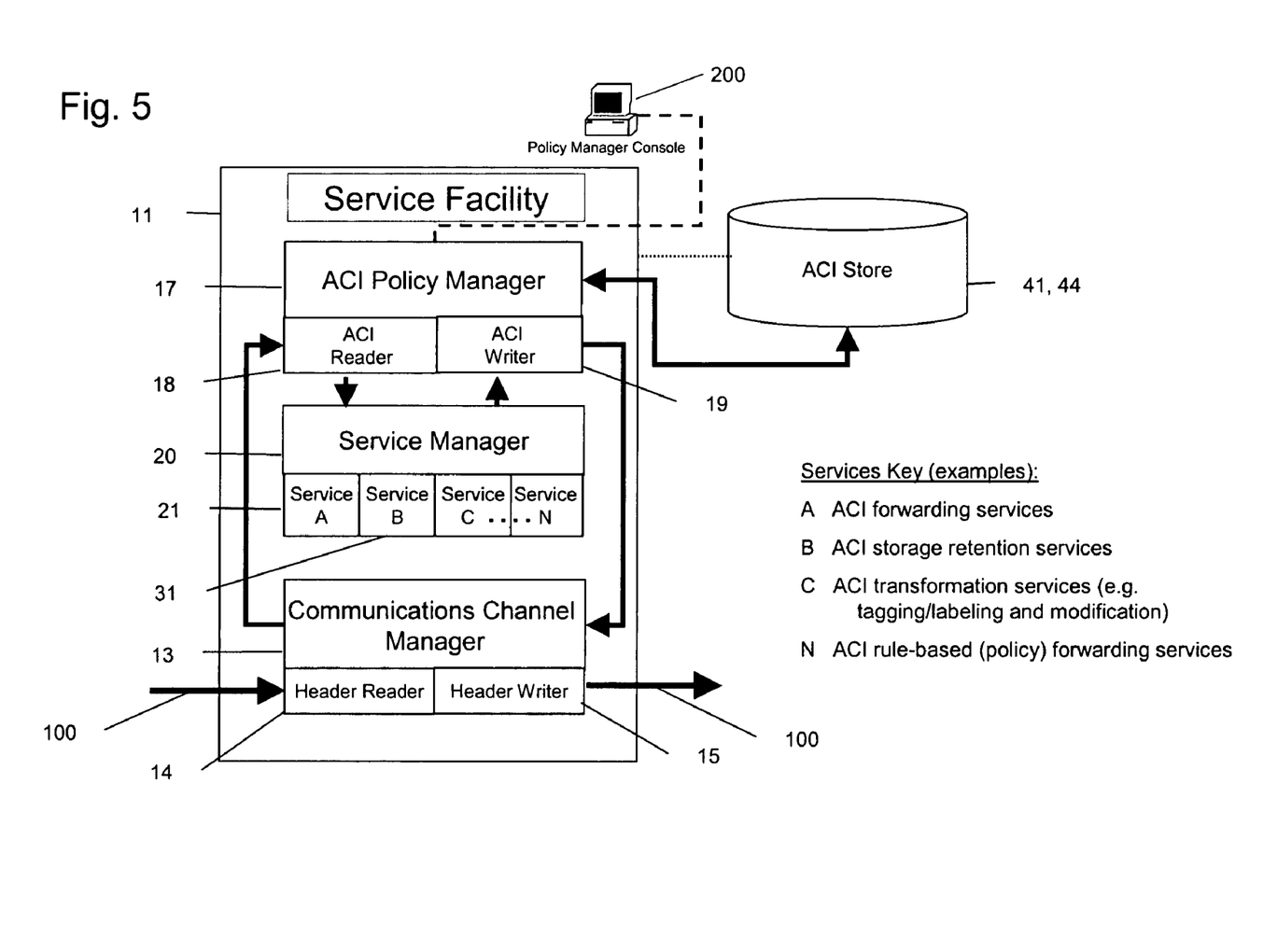
FIG. 5 is a block diagram of the modular design of the service facility providing F-Function based services of FIGS. 1-4.

The F-Functions 61-64 operate within or across one or more service applications 21, 22, 23, 32, 33 in one or more service facilities 11, 12, 13 as shown in FIGS. 2-4. These service applications can occur in the same or different network domains 51-54. Within service facility 11, "service A" 21 and "service B" 31 are two of any number of service applications that may be included within a given service facility. As shown in FIG. 5, these service applications, directed by a service manager 20, generally include ACI forwarding services, ACI retention storage services, ACI transformation rules services (e.g. tagging, modification), and ACI rules-based forwarding services (based on retention data, e.g. modified ACIs).

In the architecture shown in FIG. 2, "service A" 21 is operating in the forward path. Within facility 12, "service B" 32 is another service application that can be the same, similar to or a different ACI service application from that of "service A". "Service B" 32 of service facility 12 is operating in the return path.

FIGS. 3 and 4 illustrate the ability of the present invention to interconnect service applications 21, 22, 31, 32 within a service facility 11 and among service facilities 11, 12, respectively. FIG. 4 further illustrates implementation of the invention when an intervening application 9 exists between service facilities 11, 12.

FIG. 3 illustrates an inter-connecting services method that utilizes F-Function 65 for inspecting, modifying/translating, storing and forwarding of ACIs. The method can equally be applied when ACIs are embedded within the payload instead of in the header or when ACIs are in differing layers within the headers. FIG. 3 further illustrates multiple session service applications 21, 31 in a single domain 51 within a single service facility 11. FIG. 4 goes on to illustrate the present invention in multiple domains 51, 52 and with multiple service facilities 11, 12, each having multiple session service applications 21, 22, 31, 32.

In FIG. 3, a client computer/data source 7*a* transmits a communications request over a communications channel 100*a* to destination 8*b*. The service facility 11 with intermediary destination node 8*a* intercedes and performs a service on the request prior to re-transmittal of the request from intermediate data source node 7*b*. Upon receipt of the request, the service facility 11 retains the session's ACI metadata (or other metadata) at the "service A" 21 ACI store 41 and also utilizes the F-Function 65 to transfer the ACIs from the "service A" 21 ACI store 41 to the "service B" 31 ACI store 44, where the ACIs are retained for possible use by the "service B" 31 or other service applications later in the session's path. Any of the service applications within the service facility 11 can be applied in this store-then-forward process. The service facility 11 also utilizes the F-Function 65 to place ACIs (or other metadata) back on the outbound communications channel 100*a* for connection to the data's destination 8*b*.

Once the service facility 11 has acted upon the client's request from source 7*a* for delivery or request for reply (request for data or processing on data), the request is forwarded to the destination 8*b*. The session is then terminated if the request was only for a delivery service. In the event that data was requested, however, the session continues with a reply to the originating client 7*a*.

Still with reference to FIG. 3, when data or data processing has been requested, the reply with the requested data in its payload is transmitted on the return path, communications channel 100*b*, from the original client destination 8*b* back to the client, source 7*a*. The service facility 11 again intercedes, with "service B" 31 applying the designated service applications on the stored ACIs retrieved from the "service B" 31 ACI store 44, and utilizing the F-Function 65 to place ACIs (or other metadata) back on the communication channel 100*b* for connection to the data's return destination, namely source 7*a*.

FIG. 4 illustrates two additional elements of the present invention. First, FIG. 4 illustrates how F-Functions 61, 63, 65, 66 are utilized when cascading inter-connecting service applications 21, 22, 31, 32 are required in a multi-domain 51, 52 network. Secondly, FIG. 4 also illustrates use of the present invention where a multi-tier application processing architecture is in use between service facilities 11, 12. Cascading inter-connecting services operate independently, with or without an application 9 in the communications path 100.

In FIG. 4, the client computer/data source 7*a* transmits a communications request over the forward (or outbound) communications channel 100*a* to application server 9 and destination 8*b* within network domain 52. The service facility 11 with intermediate destination node 8*a* intercedes prior to delivery to the application server 9, and retains the session's ACI metadata (or other metadata) at "service A" 21 ACI store 41. The service facility 11 applies the designated service applications on the request and forwards the extracted ACIs to the "service B" 31 ACI store 44 for later session use. The service facility 11 also utilizes the F-Function 61 to transfer ACI metadata from the domain 51 "service A" 21 ACI store 41 to the domain 52 "service A" 22 ACI store 42 where the ACI metadata is retained and can be utilized by domain 52 "service A" 22 service applications later in the session's path. Any of the service applications within the service facilities 11, 12 can be applied in this store-or-forward process.

In both FIGS. 3 and 4, as well as any other implementations of the present invention, the transfer of the ACIs from the "service A" ACI store 41 to the "service B" ACI store 44 may occur by "pushing" thereof as has already been described. Alternatively, this transfer may be deferred, with only the ACI store 41 retaining the ACIs on the inbound path. Then, when a reply has been requested and is returned along the return communications path 100*b*, the "service B" service application may "pull" the ACIs retained in the ACI store 41 to the ACI store 44 for use on the return path. Such "push" and "pull" technologies for information retrieval and forwarding are known to persons of ordinary skill in the art.

Furthermore, while the ACI stores 41, 42, 44, 45 are shown herein as separate storage areas for the purposes of clarity in description, these areas are logical stores and may in fact be embodied together in a single memory device as would be known by persons of ordinary skill in the art.

Continuing with FIG. 4, the service facility 11 further utilizes the F-Function 65 to transfer ACI metadata from the domain 51 "service B" 31 ACI store 44 to the domain 52 "service B" 32 ACI store 45 where the ACI metadata is retained and can be utilized by domain 52 "service B" 32 service applications in the next connection in the session along communications path 100. Any of the service applications within the service facilities 11, 12 as described above can be applied in this store-or-forward process.

Finally, the service facility 12 utilizes the F-Function 63 to place ACIs (or other metadata) on the communication channel 100*a* in domain 52 for connection to the data's destination 8*b*.

At this point the client's request for data from source 7*a* in domain 51 has been forwarded to its destination 8*b* in domain 52 and is processed. In addition to the forward communication service applications 21, 22 there are return communication service applications 31, 32 as part of the overall session illustrated in FIG. 4. In a similar manner to the forwarding of ACI/metadata, the retained ACIs within the stores 41, 42, 44, 45 can be reutilized on the return communication path 100*b*. The F-Functions 63, 65, 66 continue to be utilized to transfer the ACIs between service applications 21, 22, 31, 32 and their associated storage areas 41, 42, 44, 45 across the service facilities 11, 12 on the return path 100*b*.

Continuing in FIG. 4, a reply with the requested data in its payload is transmitted on the return path, communications channel 100*b*, from the original destination 8*b* back to the client, source 7*a*. The service facility 12 intercedes by utilizing domain 52 "service B" 32, and applies the designated service applications from the retained ACIs at the "service B" 32 ACI store 45 prior to delivery to the application server (business application) 9 where the reply is then processed. The service facility 12 utilizes the F-Function 66 to transfer ACIs from the domain 52 "service B" 32 ACI store 45 to the domain 51 "service B" 31 ACI store 44 where the ACI metadata is retained and can be utilized by service facility 11 service applications in domain 51 in the next connection in the session's path.

After processing by application 9, the domain 52 service facility 12 utilizes the F-Functions 63, 66 to place ACIs (or other metadata) on the communication channel 100*b* for connection to the data's return destination, source 7*a*.

Once back in domain 51, the intervening service facility 11 utilizes domain 51 "service B" 31 and applies the designated service applications on the retained ACI retrieved from the "service B" 31 ACI store 44 prior to delivery of the reply to the client 7*a*. The service facility 11 also utilizes the F-Function 65 to place ACIs (or other metadata) on the communication channel 100*b* for connection to the data's return destination, source 7*a*.

As generally applicable to both FIGS. 3 and 4, ACI re-utilization may be filtered if an ACI rules-based service application is incorporated in the service. Furthermore, the ACI stores 41, 42, 44, 45 contain the ACIs from other services 21, 22, 31, 32 in the services facilities 11, 12 from the outbound (forward) path and metadata from the inbound (return) path which are placed in the headers of the next link in the communications path unless filtered by a rules-based service application.

Also, as generally applicable to both FIGS. 3 and 4, the session end-point terminates the ACI utilization, after which ACI metadata is no longer maintained. Multi-request sessions operate as independent requests for utilization of the F-Function facilities that are provided by the present invention.

FIG. 5 details the modular structure of a service facility 11, the same structure being applicable to service facilities 12, 13, etc. The service facility includes an ACI policy manager 17, a session service manager 20 with multiple service applications 21, 31 (A, B, C . . . n), and a communications channel manager 13.

The ACI policy manager 17 manages the organization and schema of the ACIs, and provides rules that can be applied to the ACIs, including administrative and metadata maintenance rules insertion, deletion and modification facilities. These rules are preferably input using a policy manager console 200. The ACI policy manager 17 also provides ACI reader 18 and ACI writer 19 services.

The ACI reader facility 18 allows for the transfer of the ACI metadata from the communications channel manager 13 to the ACI policy manager 17. The ACI writer facility 19 allows for the transfer of the ACI metadata from the ACI policy manager 17 to the communications channel manager 13 for transfer to another service facility 12 or for transfer of data from the ACI policy manager 17 to the ACI store 41, 44.

The communications channel manager 13 provides header reader 14 and header writer 15 services. The header reader 14 service interprets the header data at various layers of the communications stack 99 and forwards it to the ACI policy manager 17. The header writer 15 service transfers ACIs from the ACI store 41 utilizing the ACI policy manager 17 and then creates the header data at various layers of the communications stack 99.

The services described in FIG. 5 are used to read and write at various layers within the header communications stack 99 through the header reader 14 and header writer 15 services. These services provide inter-stack services capability for networks that must be transitioned across during the session but which operate at different layers within the communications stack 99, even when encryption and deencryption services must also operate and occur at different communication layers.

Figure 6:
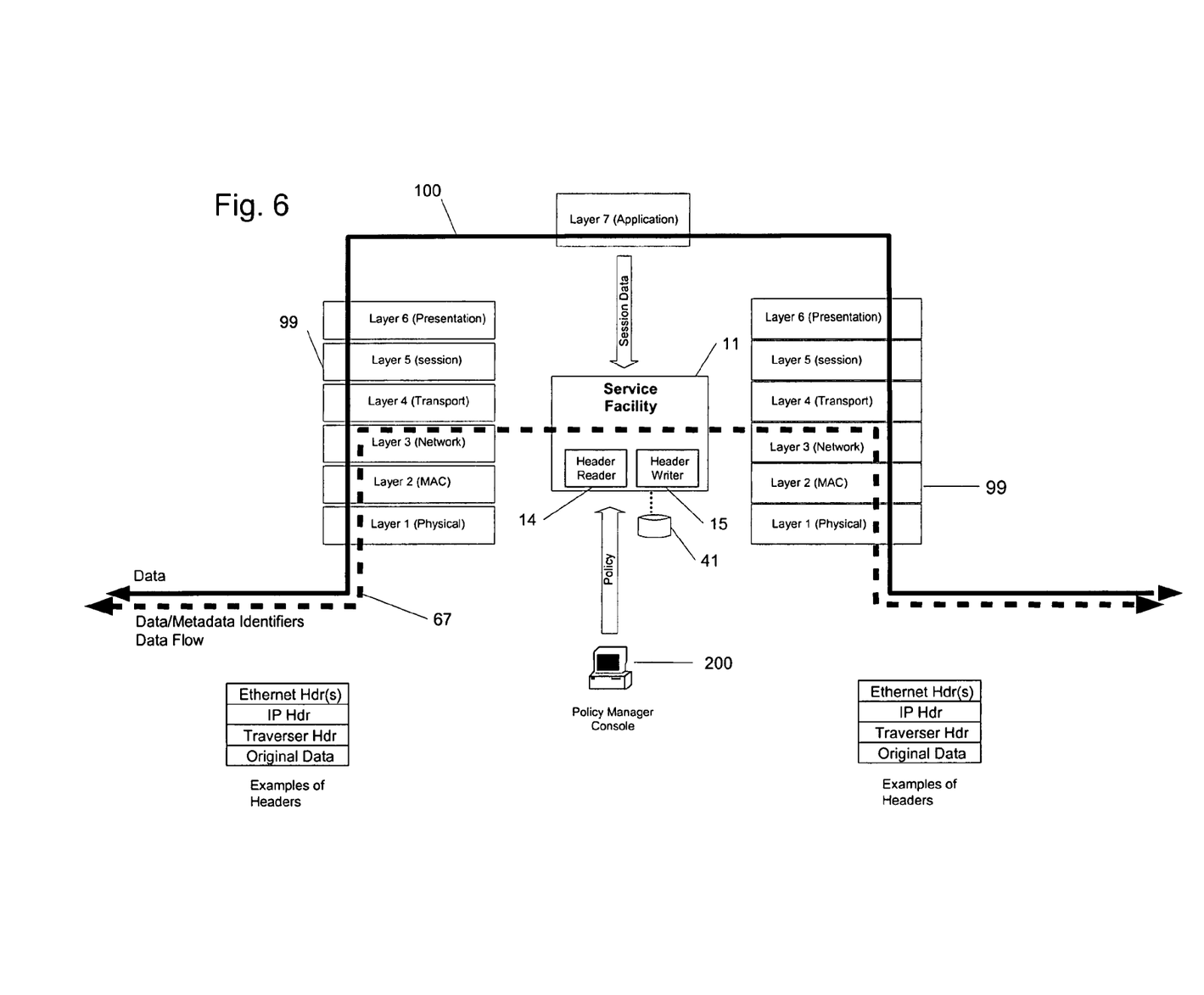
FIG. 6 is a block diagram of an F-Function transitioning method for transporting ACIs from one connection to another connection at the same layer of the communications protocol stack, according to the present invention.
Figure 7:
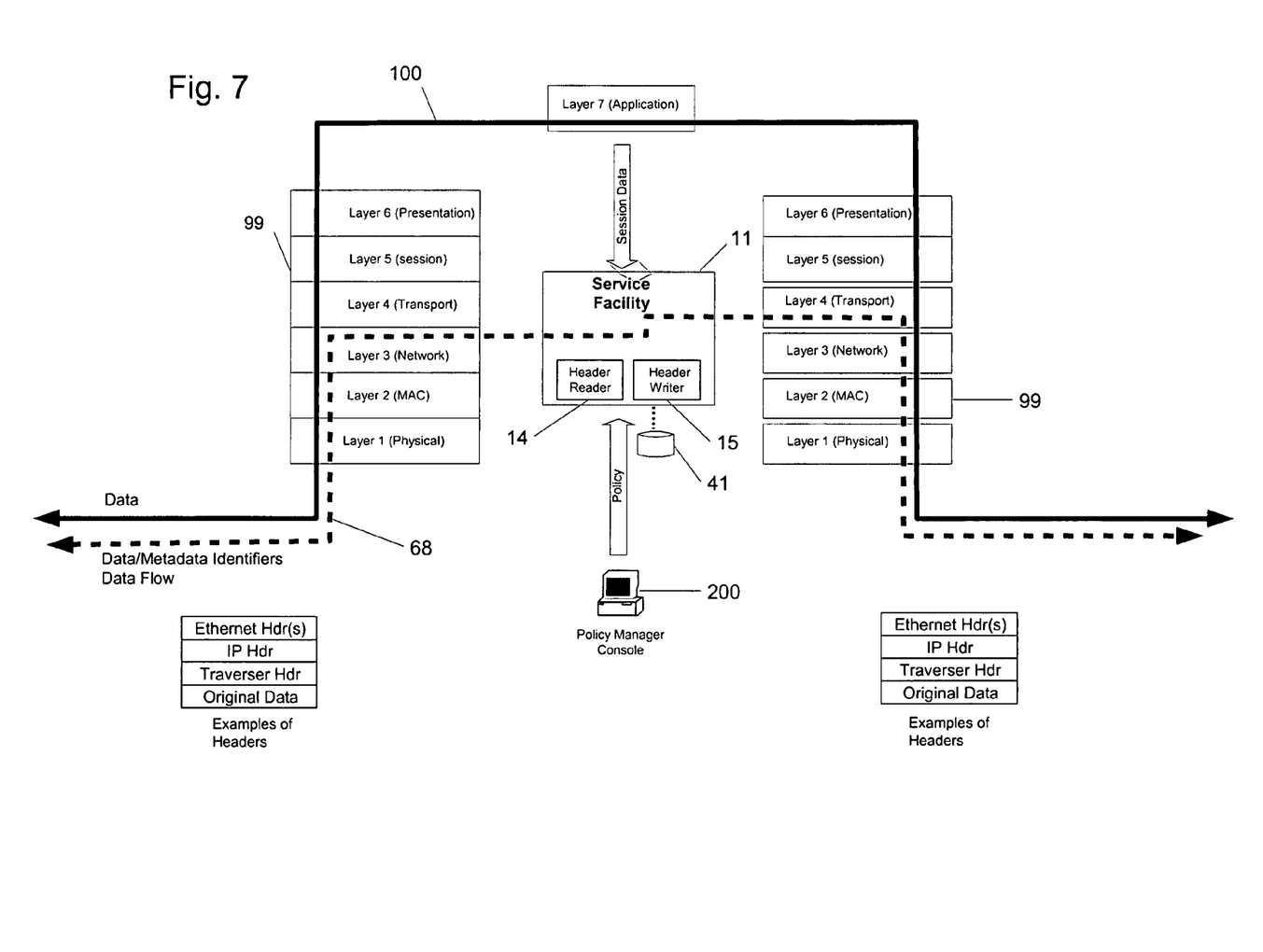
FIG. 7 is a block diagram of an F-Function transitioning method for transporting ACIs from one connection at a first layer to another connection at a higher layer of the communications protocol stack, according to the present invention.
Figure 8:
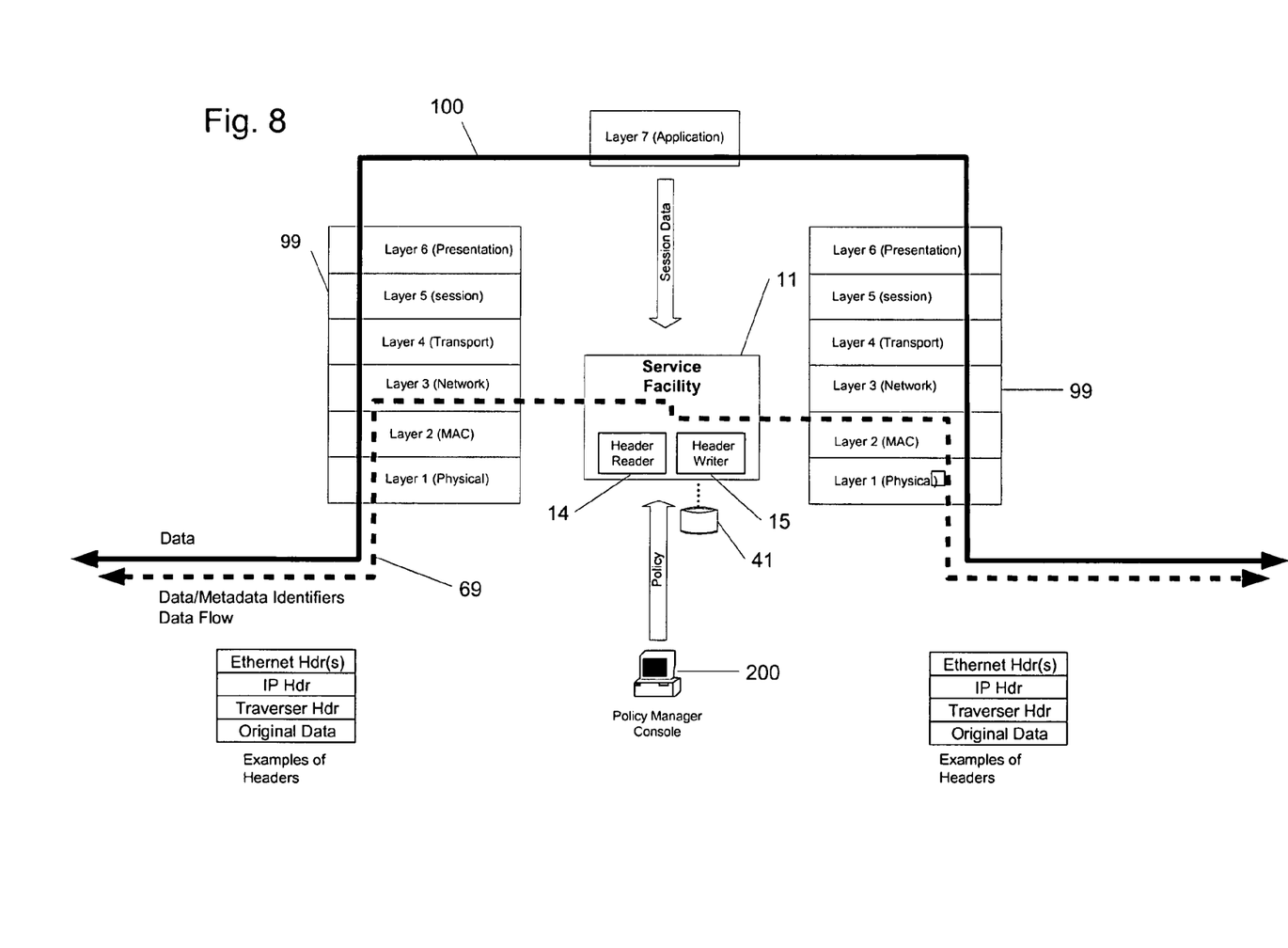
FIG. 8 is a block diagram of an F-Function transitioning method for transporting ACIs from one connection at a first layer to another connection at a lower layer of the communications protocol stack, according to the present invention.

In FIGS. 6-8, the ability of the service facility 11 to transfer ACIs at the same or a different layer of the header communications stack 99 using one or more F-Functions 67, 68, 69 is illustrated. Layered network mechanisms representative of those currently in use include ethernet, Internet protocol (IP), traverser and original data.

First, as illustrated in FIG. 6, the service facility 11 may be utilized to receive ACIs from the headers at layer 3 (or any other layer) within the stack 99 on the incoming communications path 100 and to transmit the same, modified or filtered ACIs on an outgoing communications path 100 in the headers at the same layer of the communications stack.

Second, the service facility 11 may be utilized to receive ACIs from the headers at layer 3 (or any other layer) within the stack 99 on the incoming communications path 100 and to transmit the same, modified or filtered ACIs on an outgoing communications path 100 in the headers at a higher layer of the communications stack, representatively layer 4, as illustrated in FIG. 7.

Third, the service facility 11 may be utilized to receive ACIs from the headers at layer 3 (or any other layer) within the stack 99 on the incoming communications path 100 and to transmit the same, modified or filtered ACIs on an outgoing communications path 100 in the headers at a lower layer of the communications stack, representatively layer 2, as illustrated in FIG. 8.

As described herein, the present invention may be used in multi-tier applications that are prevalent in service-oriented architectures or web-service architectures to enforce a content-based access decision across a multi-tier structure. In the first connection of the session, the client may connect to the application tier with network or data ACIs transported at the network layer (layer 3). These ACIs are retained by an intervening service facility and then re-utilized by the application server to connect to a database server, with the service facility utilizing an F-Function that applies rules based on the received ACIs so that the proper data at the database server is accessed and returned to the application server while retaining the session data applied by the F-Function as ACI data to the client connection. With the present invention, ACI data can be transitioned by any layer in the communications stack, for any layer above that layer that does not transition such data.

Figure 9:
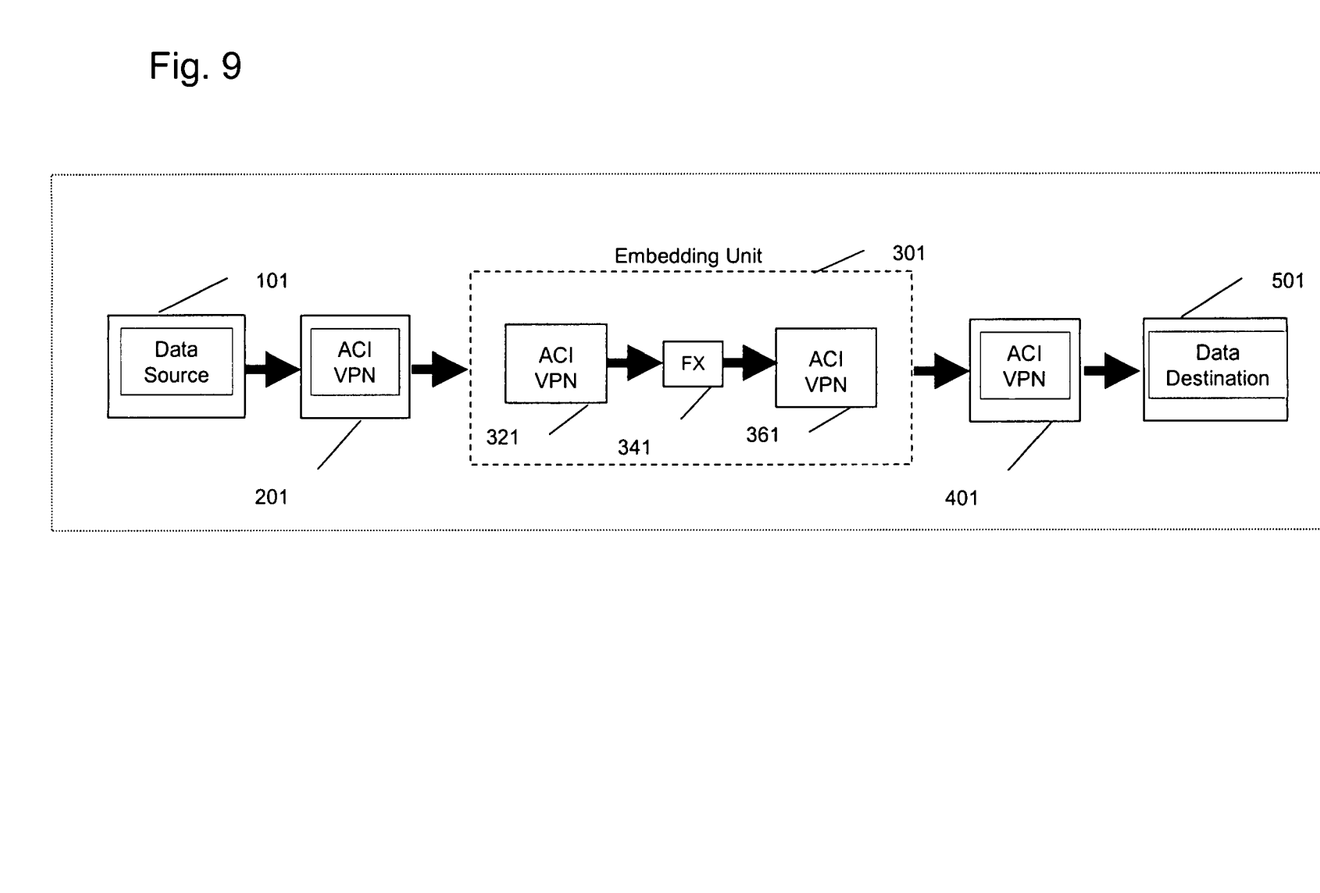
FIG. 9 shows a block diagram of an embodiment for embedding functions requiring cleartext within a secure network that provides encryption, according to the present invention.

As shown in FIG. 9, the present invention is further directed to a system and methodology for enabling computer network functions requiring cleartext, such functions being designated herein by the letter FX, to be embedded and effectively operated within a secure network that provides encryption, while retaining associated ACIs from the data source to the data destination.

Inbound IP data streams are initiated by a data source 101. Associated with the data source 101, is a first ACI virtual private network (VPN) 201 that encrypts the data at the data source 101 and includes all associated network information, including data source and destination-peculiar ACIs.

An embedding unit 301 receives the inbound encrypted data from the first ACI VPN 201. The embedding unit 301 includes a second ACI VPN 321 at the input, an embedded FX function 341, and a third ACI VPN 361 at the output. In order to read the ACIs that are placed on the IP data stream, the embedding unit 301 is able to first read the identifiers from each inbound IP stream and then to place these identifiers on each outbound IP stream such that the ACIs originally placed on the data packets are not lost.

Thus, according to the present invention, the second ACI VPN 321 performs decryption on the incoming data. The ACIs extracted from the decrypted data are stored in a storage device such as a table or other storage element. The FX function 341 is injected, such FX function operating upon the decrypted data such that the FX function is performed correctly, with the stored ACIs being traversed across the FX function without interfering therewith. At the output of the embedding unit 301, the third ACI VPN 36 then re-encrypts the data stream and re-introduces the traversed ACIs into the outbound encrypted data stream for effective network level access control.

A fourth ACI VPN 401 decrypts the data in the outbound data stream at the data destination 501 and uses the ACIs, which have been successfully maintained through the operation of the embedding unit 301, to ensure proper delivery.

As described, the present invention provides a mechanism by which IP/IPsec data streams that contain access control identifiers are terminated at the embedding unit without loss of the ACIs. The data from the inbound IP packets is unencrypted and the ACIs associated therewith are read and stored. The FX function injected in the data stream is performed on the cleartext, after which the data is again encrypted and the stored ACIs are subsequently reintroduced to the outbound IP packets to instantiate a secure channel with the destination system.

The foregoing descriptions and drawings should be considered as illustrative only of the principles of the invention. The invention may be implemented in a variety of configurations and is not limited by the configurations illustrated herein. Numerous applications of the present invention in connection with network communications will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method of traversing an access control identifier (ACI) across intervening service facilities along a network communication path to retain session data throughout a session, comprising the steps of:

sending a data request having a header with an ACI from a data source toward a final data destination over a communications path, said path having a first intervening service facility and a second intervening service facility between said data source and said final data destination, said first intervening service facility including at least a first service application with a first memory and a first inter-service transport mechanism, said second intervening service facility including at least a second service application with a second memory and a second inter-service transport mechanism;

receiving said data request at said first intervening service facility;

reading said ACI in said header and writing said ACI to said first memory;

transferring said ACI to said second intervening service facility using said first inter-service transport mechanism and writing said ACI to said second memory; retaining said ACI in said second memory and also transferring, using said second inter-service transport mechanism, said ACI's to a third memory in said second service facility for use later in the session;

applying said first service application to said data request;

forwarding said data request to said second intervening service facility over said communications path; applying said second service application to said data request by said second service facility;

writing said ACI's from said second memory back into said header and placing said data request back on said communications for forwarding to said final data destination such that said ACI's are retained throughout said session; and said communications path including a communications stack having a plurality of layers, said steps of reading and writing being performed at any of said layers having a layer thereabove which does not transition session data.

2. The method as set forth in claim 1, wherein said step of reading said ACI is performed from a first layer of said communications stack on an inbound side of said first service facility and said step of writing said ACI is performed to a second layer of said communications stack on an output side of said first service facility, said first layer being higher than said second layer within said communications stack.

3. The method as set forth in claim 1, wherein said step of reading said ACI is performed from a first layer of said communications stack on an inbound side of said first service facility and said step of writing said ACI is performed to a second layer of said communications stack on an output side of said first service facility, said first layer being lower than said second layer within said communications stack.

4. The method as set forth in claim 1, wherein said step of reading said ACI is performed from a first layer of said communications stack on an inbound side of said first service facility and said step of writing said ACI is performed to a second layer of said communications stack on an output side of said first service facility, said first layer and said second layer being at a same level within said communications stack.

5. The method as set forth in claim 1, wherein said third memory in said second service facility operates in a return path from said final data destination to said data source.

6. The method as set forth in claim 5, further comprising the steps of:

transmitting a reply from said final data destination back to said data source;

receiving said reply at said second service facility;

applying said second service application to said reply;

retrieving said ACI stored in said third memory in connection with said data request; and writing said stored ACI into the reply header and placing said reply back on said communications path for forwarding to said data source.

7. The method as set forth in claim 1, wherein said first service facility includes a decryption unit and an encryption unit, said method including the steps of decrypting encrypted inbound data prior to the step of applying the first service application, and encrypting the decrypted data after the step of applying the first service application.

8. A method of traversing access control identifiers (ACIs) across multiple network domains and for retaining said ACIs throughout a session, comprising the steps of:

sending a data request having a header with ACIs over a communications path from a data source in a first domain toward a final data destination in a second domain, said first domain having along said path a first intervening service facility between said data source and said final data destination, said second domain having along said path a second intervening service facility between said first intervening service facility and said final data destination, said first intervening service facility in said first domain including a first "service A" application with a first "memory A", a first "service B" application with a first "memory B", and a plurality of inter-service transport mechanisms, said second intervening service facility in said second domain including a second "service A" application with a second "memory A", a second "service B" application with a second "memory B", and a plurality of inter-service transport mechanisms;

receiving said data request at said first intervening service facility;

reading said header and retaining said ACIs in said first "memory A" and also transferring said ACIs to said first "memory B" using a first one of said inter-service transport mechanisms for use later in the session;

performing said first "service A" application on said data request by said first service facility;

forwarding said data request from said first service facility to said second service facility over said communications path;

utilizing a second one of said inter-service transport mechanisms to transfer said ACIs from said first "memory A" in said first service facility to said second "memory A" in said second service facility;

retaining said ACIs in said second "memory A" and also transferring said ACIs to said second "memory B" for use later in the session using a third one of said inter-service transport mechanisms;

performing said second "service A" application on said data request by said second service facility;

writing said ACIs back into header and placing said data request back on said communications path for forwarding to said final data destination, said ACIs having been retained throughout said session.

9. The method as set forth in claim 8, wherein said communications path includes a communications stack having a plurality of layers, said steps of reading and writing being performed at any of said layers within said communications stack that have a layer thereabove which does not transition session data.

10. The method as set forth in claim 8, wherein said communications path includes a communications stack having a plurality of layers, said step of reading said ACI being performed from a first layer of said communications stack on a respective inbound side of said service facilities and said step of writing said ACI being performed to a second layer of said communications stack on a respective output side of said service facilities.

11. The method as set forth in claim 10, wherein said first layer is higher than said second layer within said communications stack.

12. The method as set forth in claim 10, wherein said first layer is lower than said second layer within said communications stack.

13. The method as set forth in claim 10, wherein said first layer and said second layer are at a same level within said communications stack.

14. The method as set forth in claim 10, further comprising the steps of:

transmitting a reply from said final data destination in said second domain back toward said data source in said first domain;

receiving said reply at said second intervening service facility;

performing said second "service B" application on said reply by said second service facility;

retrieving said ACIs stored in said second "memory B" in connection with said data request;

utilizing a fourth one of said inter-service transport mechanisms to transfer said ACIs from said second "memory B" in said second service facility to said first "memory B" in said first service facility, and forwarding said reply from said second intervening service facility to said first intervening service facility over said communications path;

performing said first "service B" application on said reply by said first service facility; and writing said ACIs back into said header and placing said reply back on said communications path for forwarding to said data source, said ACIs having been retained throughout said session.

* * * * *